(12) United States Patent
Casillas

(10) Patent No.: US 6,267,434 B1
(45) Date of Patent: Jul. 31, 2001

(54) MULTI-PURPOSE FAIRING

(75) Inventor: Antonio L. Casillas, Worthington, OH (US)

(73) Assignee: FSD Corporation, Columbus, OH (US)

( * ) Notice: Subject to any disclaimer, the term of this patent is extended or adjusted under 35 U.S.C. 154(b) by 0 days.

(21) Appl. No.: 09/041,623

(22) Filed: Mar. 13, 1998

(51) Int. Cl.[7] .................................................. B60J 1/00
(52) U.S. Cl. ........................... 296/180.1; 296/180.5
(58) Field of Search ........................... 296/37.6, 180.1, 296/180.2, 180.3, 180.5

(56) References Cited

U.S. PATENT DOCUMENTS

| | | | |
|---|---|---|---|
| 4,685,715 | * | 8/1987 | Hardin ................................... 296/1 S |
| 4,746,160 | * | 5/1988 | Wiesemeyer .......................... 296/1 S |
| 4,750,772 | * | 6/1988 | Haegert ................................. 296/1 S |
| 4,775,179 | * | 10/1988 | Riggs .................................. 296/180.2 |
| 4,883,307 | * | 11/1989 | Hacker et al. ...................... 296/180.2 |
| 4,890,879 | * | 1/1990 | Hurlock .............................. 296/180.2 |
| 5,078,448 | * | 1/1992 | Selzer et al. ........................ 296/180.2 |
| 5,513,894 | * | 5/1996 | Ragsdale ............................. 296/180.2 |
| 5,658,038 | * | 8/1997 | Griffin ............................... 296/180.2 |

\* cited by examiner

*Primary Examiner*—D. Glenn Dayoan
*Assistant Examiner*—Lori L. Coletta

(57) ABSTRACT

A multi-purpose fairing for mounting behind the cab body or sleeper box side extensions between the floor line and the roof line and outside the arc of the trailer when mounted to the fifth wheel. The multi-purpose fairing converts space behind the truck cab into a usable storage volume and includes three skins acting as a structural frame with a sealed top cap, a sealed bottom, utility shelves, and a door or doors allowing access to the interior storage space. The skins are supported by extrusions designed for multiple functions including an integrated hand rail, a T-slot for a rubber corner bumper, and joggle locks to lock the skins into position.

20 Claims, 11 Drawing Sheets

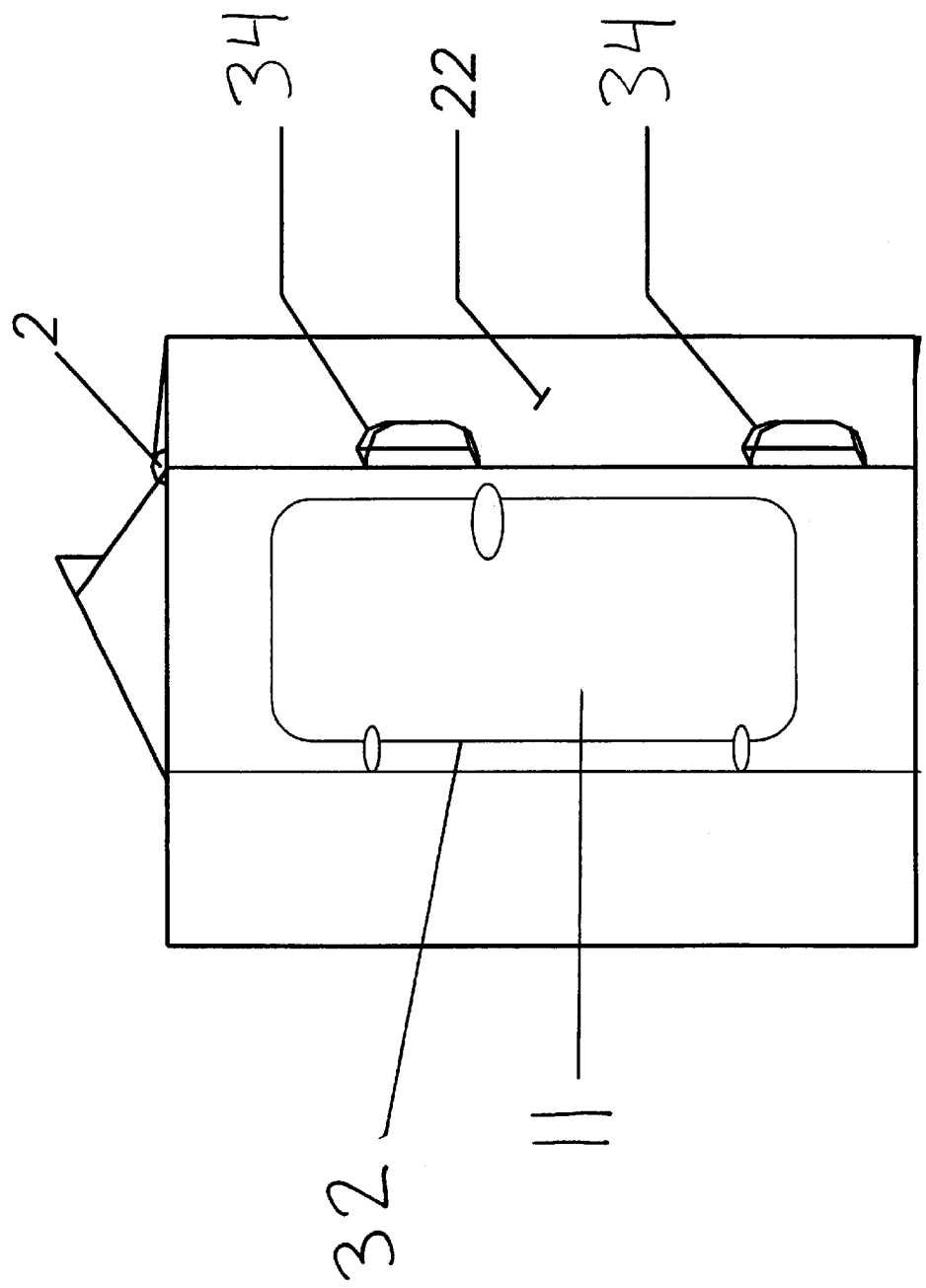

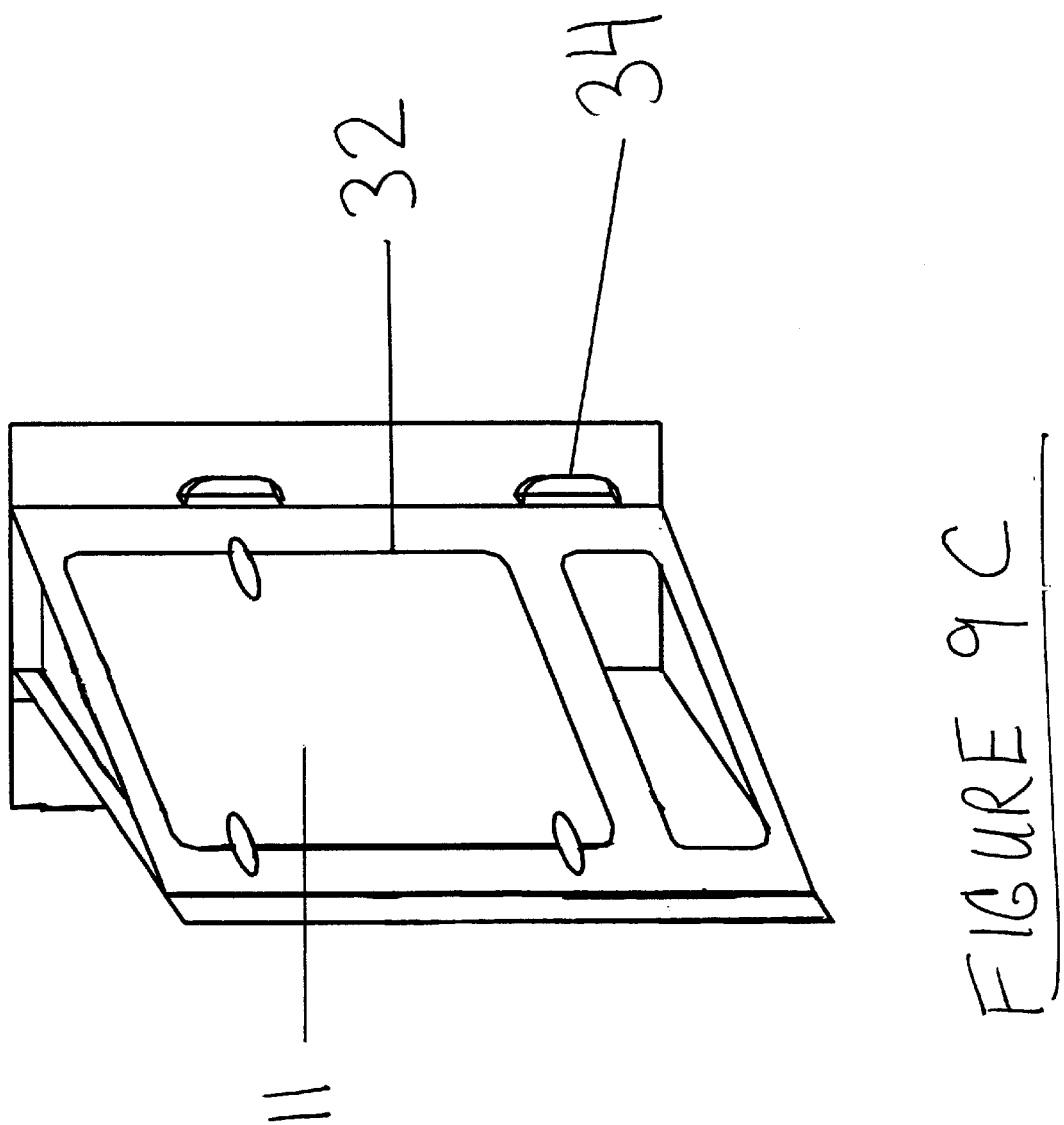

MULTI-PURPOSE FAIRING

FIELD OF THE INVENTION

This invention relates in general to truck and semi-tractor/trailer vehicles and side extensions attached for aerodynamics and in particular to the open triangle area behind the cab body or sleeper box side extensions between the floor line and the roof line and outside the arc of the trailer when mounted to the fifth wheel.

BACKGROUND AND SUMMARY OF THE INVENTION

Due to a lack of current product availability to contain the open triangle area behind the cab body or sleeper box side extensions in semi-tractor trucks, the area is being used by truck drivers who attempt to modify the space with novice contraptions in an effort to gain use of this area on the vehicle. The volume of the space equals approximately 2.3 cubic feet of usable or potential storage space.

The novice contraption type of innovation by truck drivers, though well intended, results in issues of highway safety, i.e., flying objects, and the potential damage caused by arbitrary attachment of items such as coffee cans tie-wrapped to brackets to hold hardware or, as in one observation, holes drilled in the support brackets of the side extensions to attach a small plastic tackle box.

Several test market studies performed between July of 1994 and April of 1995 using a concept model, resulted in the following findings: (1) Truck drivers like the idea of converting this otherwise useless area into usable space. (2) Currently there are no known units on the market to fit this need. The only available alternative currently on the market that provides similar utilization, is chassis mounted and is extremely heavy in weight. (3) The use of this space is considered by major OEM's and other after market manufactures not to be practical due to three constraints:

(1) Weight—using current truck design philosophies, a unit would evolve as a heavily designed structure to support its own weight, which would require structural upgrading to the cab or sleeper box in the areas to which the unit would attach.

(2) Shock Mount—the vehicle cab or sleeper box rear shock mounts would require re-design or modification, which would affect the vehicle ride characteristics.

(3) Manufacturability/Cost—to build such a unit would be labor intensive to fabricate, to modify mountings and attachment areas, and to install.

Whatever the precise merits, features and advantages of prior art relating to products intended to alter air flow and current and compartment utilization, none achieve or fulfills the purpose and/or intent of the Multi-Purpose Fairing.

The principle objective of the present invention is to address the side extension attached for aerodynamics and in particular the open triangle area behind the Cab Extensions, between the floor line and the roof line and outside the arc of the trailer when mounted to the fifth wheel and to convert this area considered a "dead zone" or "useless space" into a unique application for a uniquely designed product to produce usable storage space.

BRIEF DESCRIPTION OF THE DRAWINGS

FIG. 9A is a perspective view illustrating the invention with the door closed.

FIG. 9C is a perspective view illustrating an alternate embodiment of the invention with the door closed.

DETAILED DESCRIPTION OF THE PREFERRED EMBODIMENT

Figure 1:
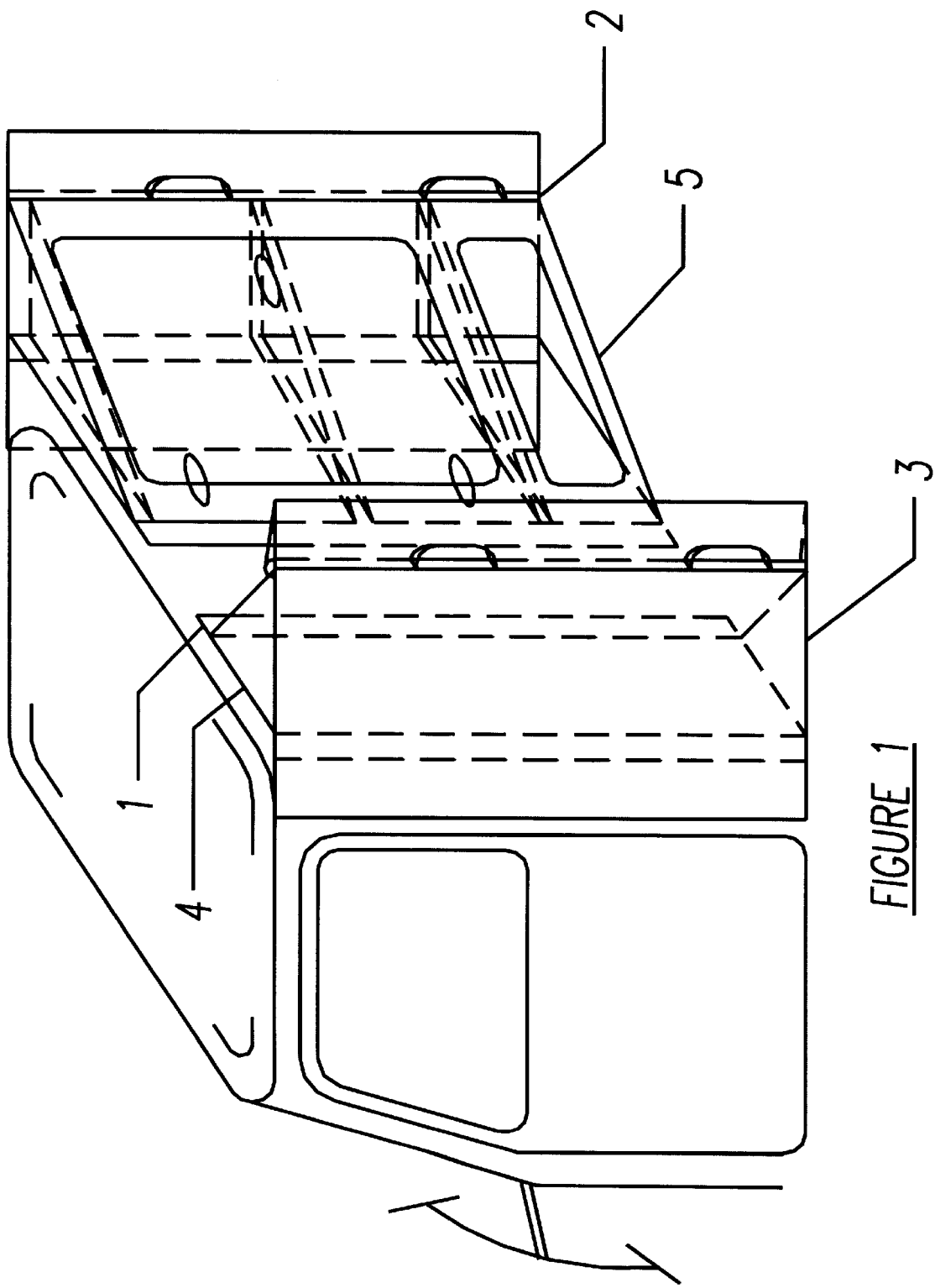
FIG. 1 is an isometric view of a completed unit as illustrated installed.

FIG. 1 shows how the Multi-Purpose Fairing (a.k.a. "MPF") incorporates the use of designed-in shapes and extrusions, items 1 and 2, specifically designed for multiple purposes to eliminate the need of an interior frame or complex joint designs.

Adding to the formula was the use of structural adhesives and joint compounds which would absorb or dampen both shock and vibration.

The skins, items 3, 4, and 5, act as the structural framing of the unit being supported by the extrusions to form a triangle-tower shaped frame to absorb and distribute torsion created by the sleeper box or cab as the chassis articulates.

Figure 2:
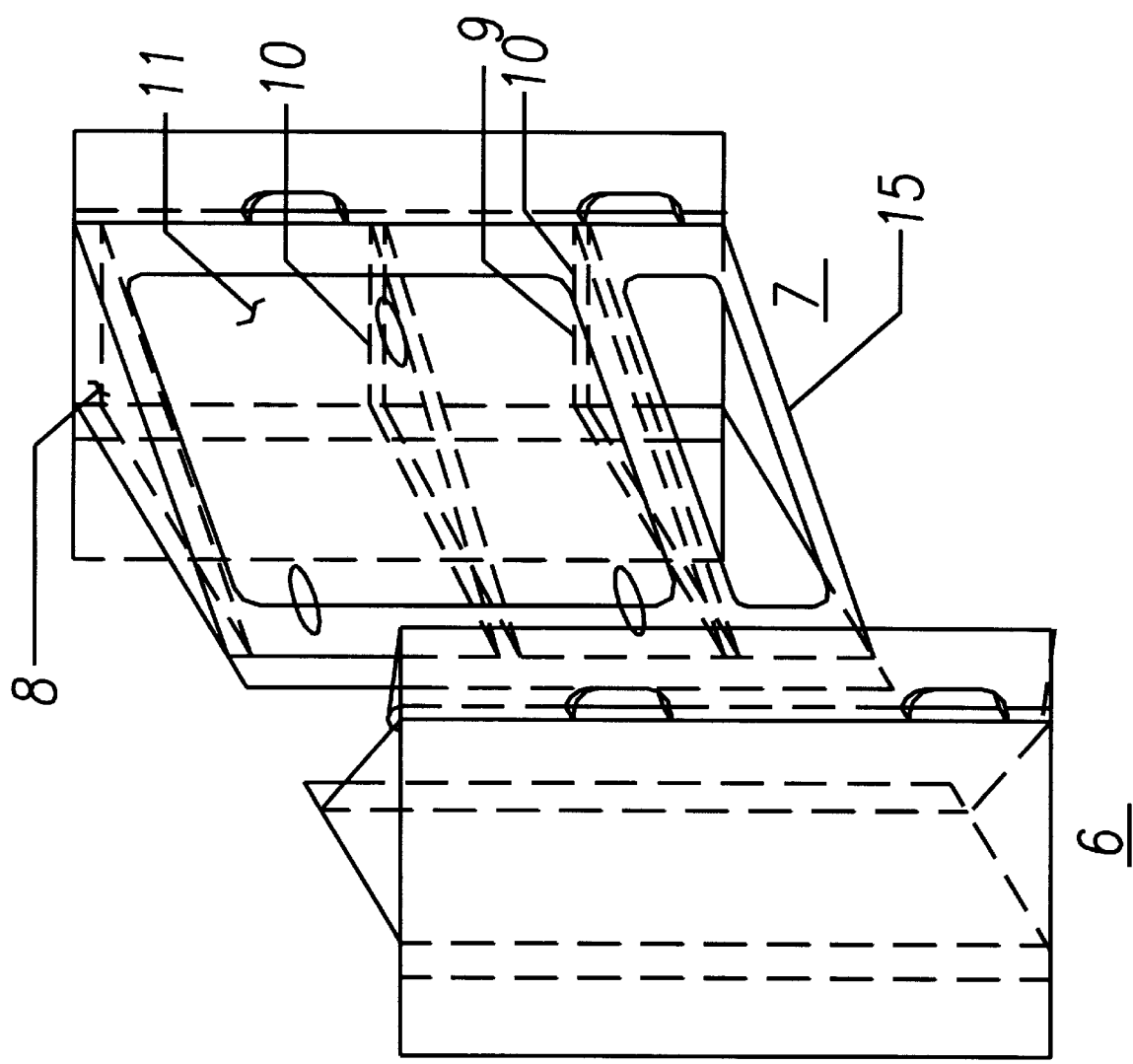
FIG. 2 is an isometric illustration of the two independent halves.

FIG. 2 shows that the MPF is comprised of one independent left hand assembly, item 6, and one independent right hand assembly, item 7, and will be manufactured from light weight material and designed in the shape of a near right angle triangular tube set to a specific length and having both a sealed top cap, item 8, and a sealed bottom, item 9, so assembled to prevent exposure to the outside environment.

Each assembly, left or right, will be equipped with utility shelves, item 10, with a flange, item 30, designed to prevent objects from falling out when the door is opened. The sealed bottom, item 9, can also be used as a utility shelf.

Door, item 11, is mounted such that it will allow access to the interior of either side assembly without jeopardizing personal safety of the user.

Additionally, the door will have a seal, item 32, which in the door-closed position, will prevent interior exposure to the outside environment.

Figure 3:
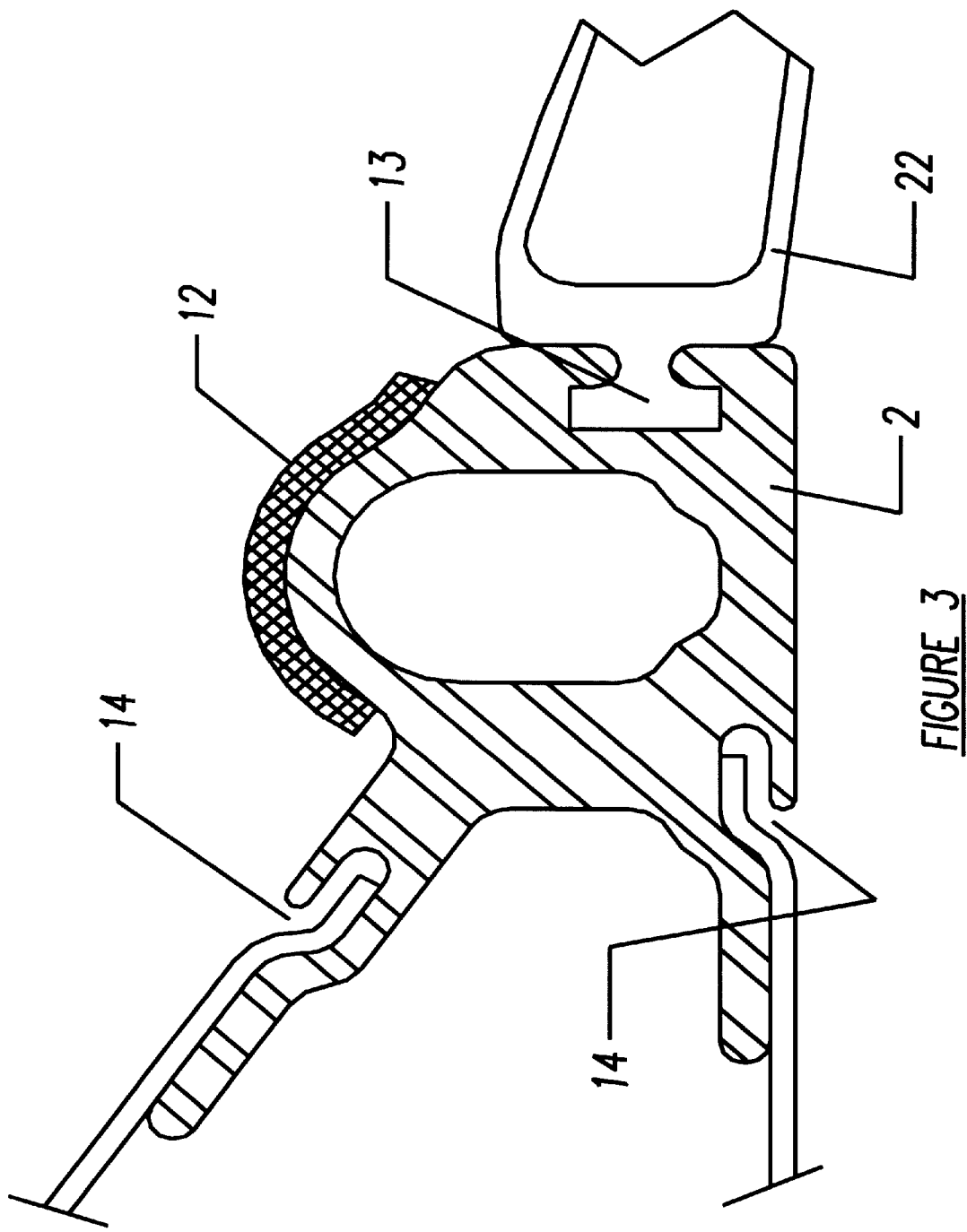
FIG. 3 is a cross section of the assembly of the side panels, rubber extension and specially designed aluminum extrusion.

Shown in FIG. 3 is an extrusion, item 2, which is located at each assembly's aft most position as shown in FIG. 1 as item 2, and which has been designed for multiple functions—integrated hand rail, item 12; T-slot, item 13, for rubber corner bumper, item 22; and joggle locks, item 14 to lock the side panels (shown in FIG. 1 as items 3 and 5) into position.

An option shown in FIG. 2 as item 15 and located at the lower ¼ of each assembly, is an area designed to hold and secure the cargo lock bars.

Figure 4:
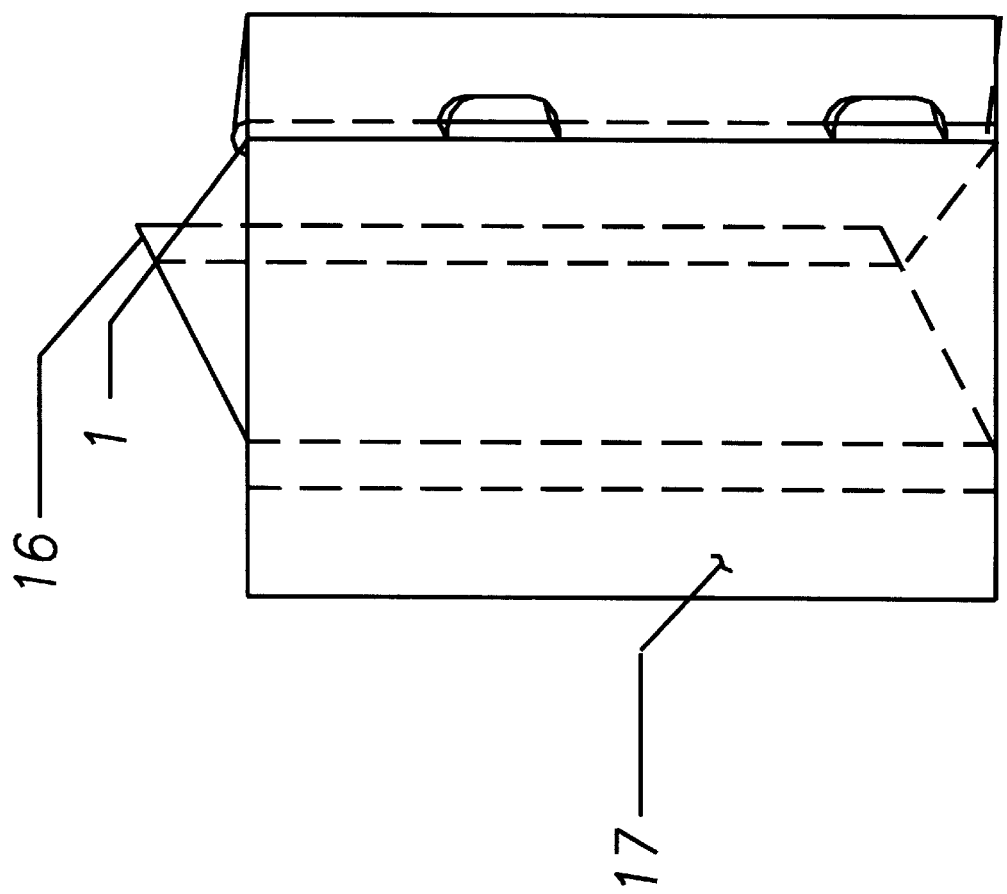
FIG. 4 is an isometric view looking aft to illustrate the body mounting flanges.

Shown in FIG. 4, each assembly will be designed with two mounting flange surfaces, items 16 and 17, to secure each assembly to either the left or right hand side of the cab or sleeper box as shown in FIG. 1.

Figure 5:
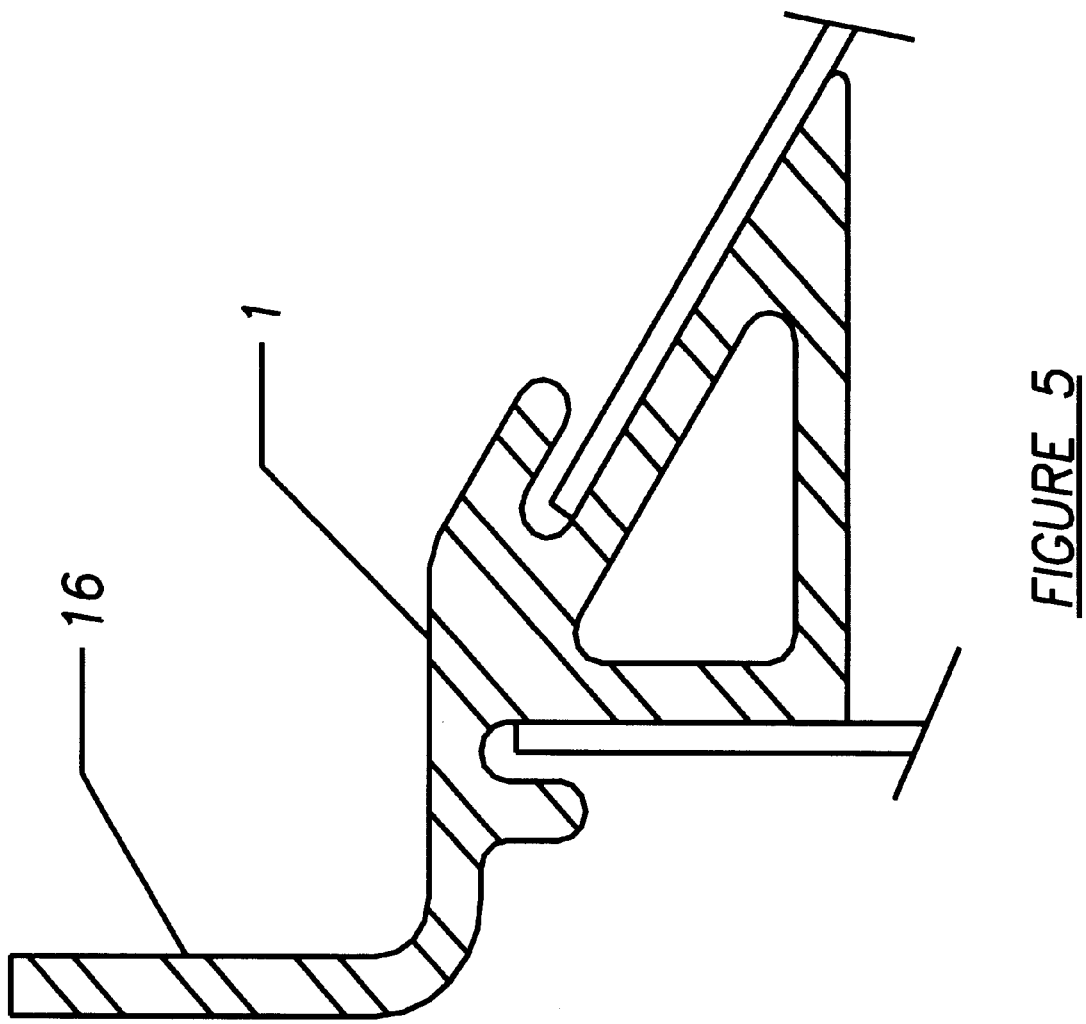
FIG. 5 is a detail cross section of the assembly of the forward and inner panels to inner mounting flange extrusion as shown in FIG. 4.

Shown in FIG. 5, the in-board flange, item 16, is part of a multi-purpose extrusion, item 1, which each assembly will have and is similar in function to the aft most extrusion as shown in FIG. 3.

Figure 6:
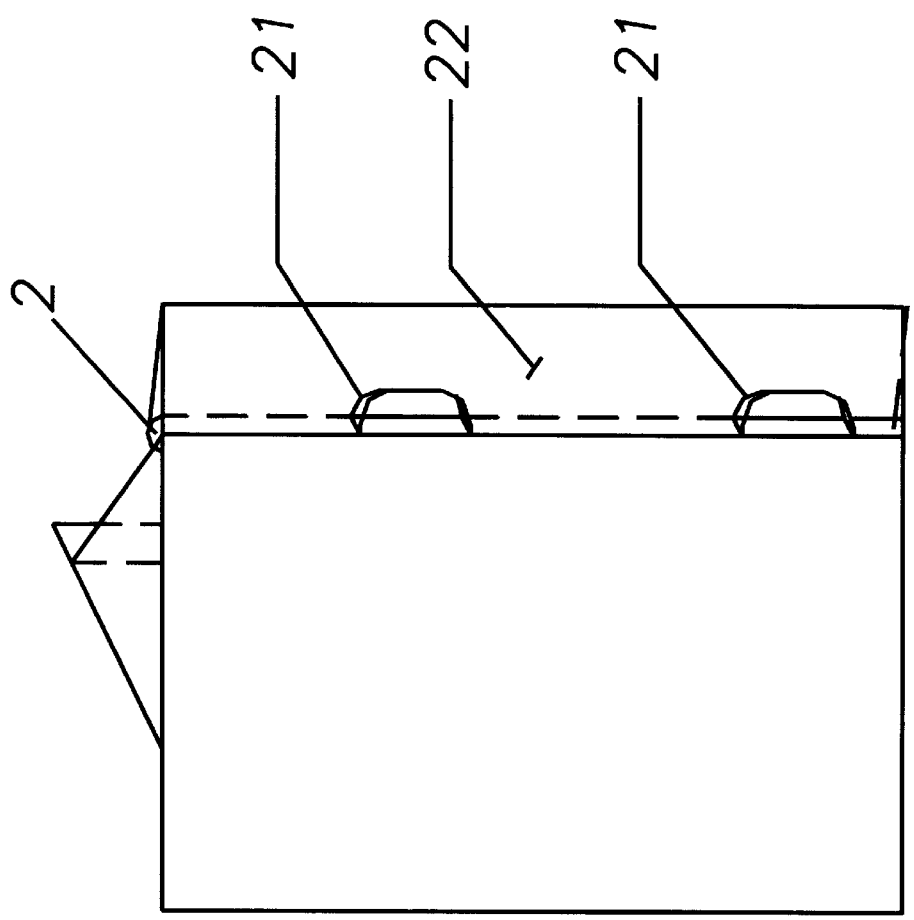
FIG. 6 is an isometric view illustrating design simplicity of this invention.

As shown in FIG. 6, the vertical extrusion, item 2, is so designed to incorporate three primary functions:

(1) There are two slotted joggles, items 14 and shown cross-sectioned in FIG. 3 as item 14, which match congruent joggles in the two side panels shown in FIG. 1 as items 3 and 5. These joggles serve as "locking joints" to add rigidity to the triangle they form.

Figure 7:
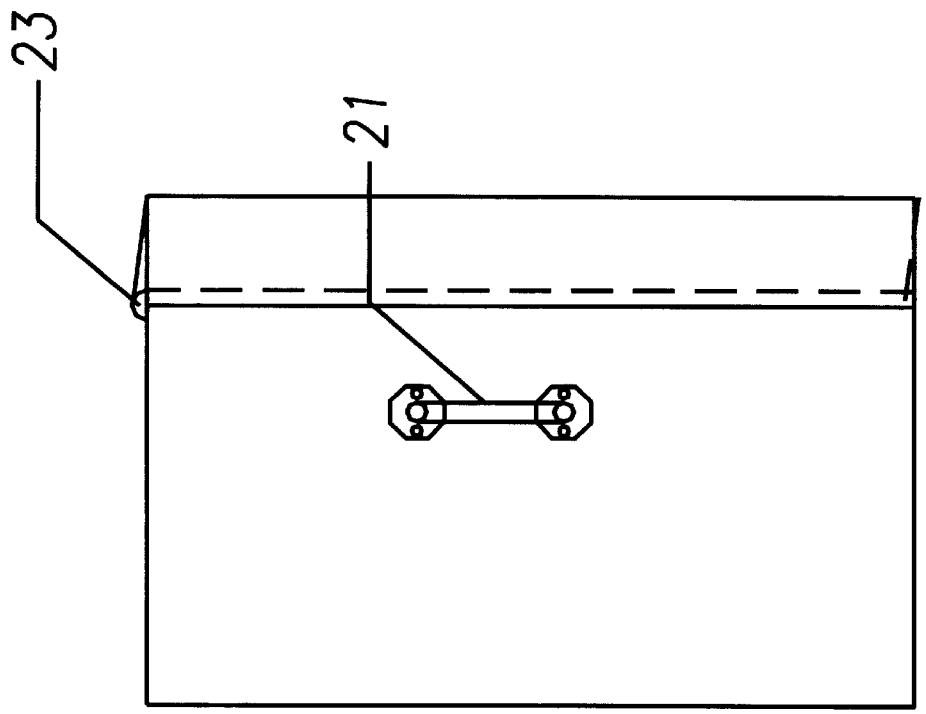
FIG. 7 is an isometric view illustrating prior art side extension design complexity.

(2) The design of the aft extrusion is such that it incorporates a hand rail in its design, item 12 and shown cross-sectioned in FIG. 3 as item 12, and eliminates the need for externally mounted grab rails such as that shown in FIG. 7 as item 21. Subsequently, this eliminates the need for externally mounted hand rails which become obstructions in the view of the driver as seen in the side view mirrors. This additionally reduces the quantity of components needed plus their weight.

Figure 8:
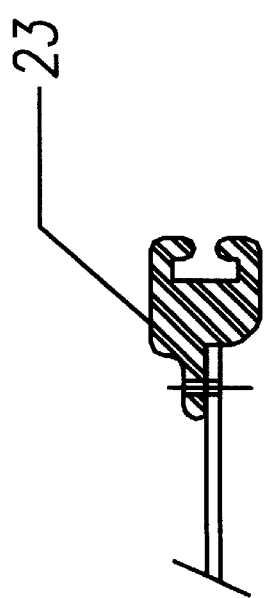
FIG. 8 is a cross section illustrating prior art side extension design complexity.
Figure 9B:
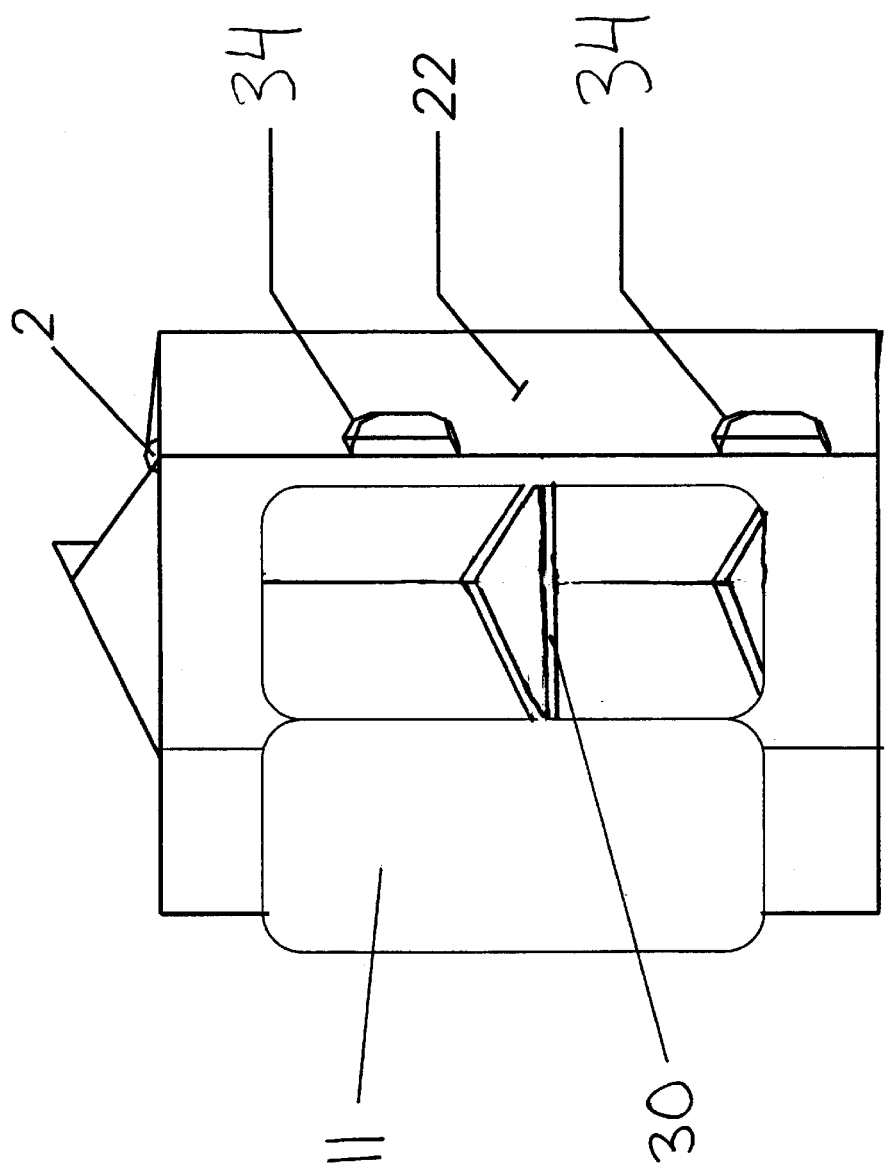
FIG. 9B is a perspective view of the embodiment of FIG. 9A shown with the door open.
Figure 9D:
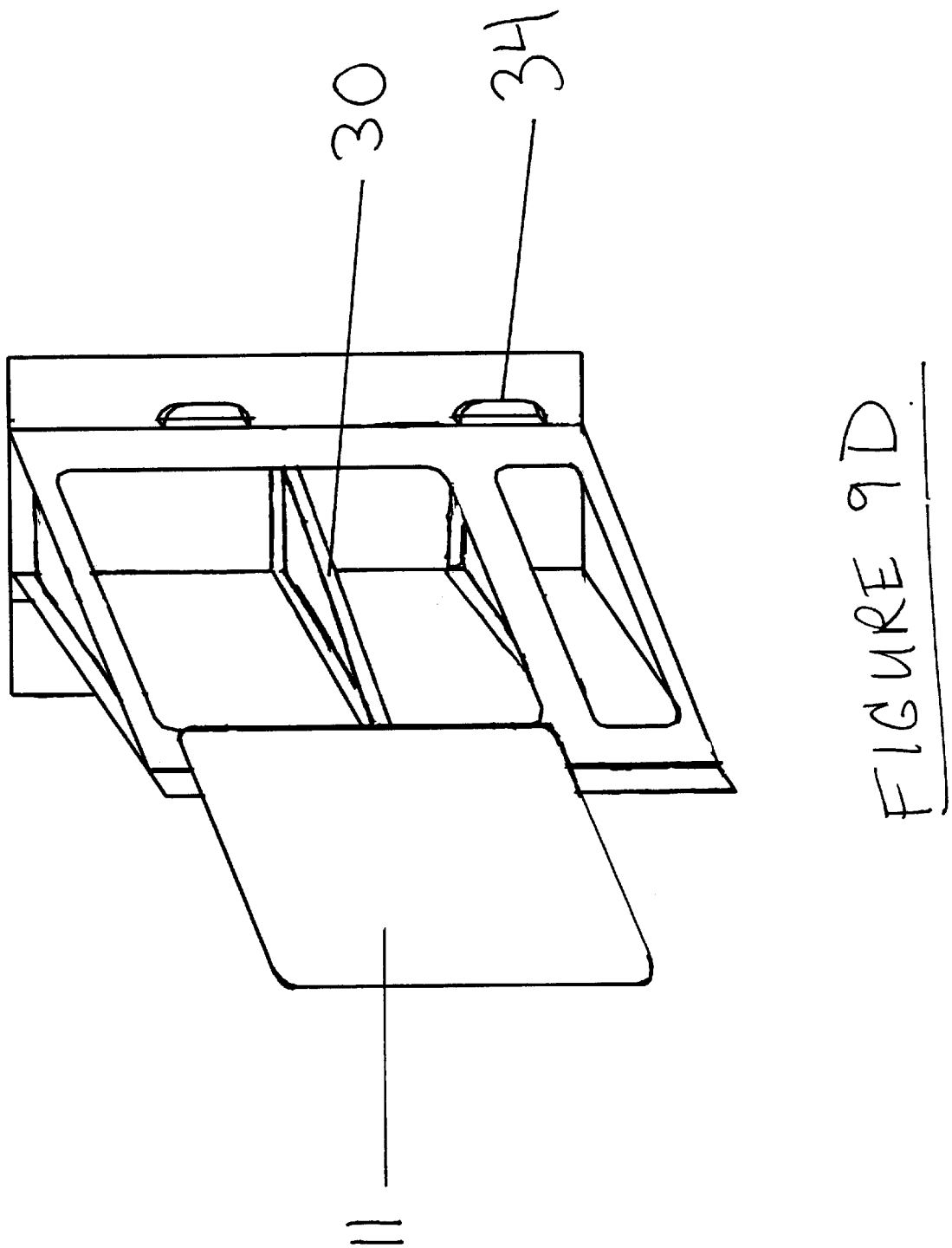
FIG. 9D is a perspective view of the embodiment of FIG. 9C shown with the door open.

(3) The aft most T-slot, item 13 in the extrusion and shown cross-sectioned in FIG. 3 as item 13, eliminates the need of an attached extrusion as shown in FIGS. 7 and 8 as item 23 of the prior art to secure the rubber corner bumper, item 22, thus again reducing components, their weight and the need for riveting, now required to mount the rubber corner bumper extrusion to standard side extensions. The rubber corner bumper, item 22, also includes one or more openings 34 serving as hand grips.

The MPF is so designed to incorporate what is current industry standard practice for aerodynamics, but the novelty comes from the cumulating of elements so adjoined to utilize an area otherwise thought to be "dead space" or impractical for any useful purpose.

The design philosophy is opposite standard truck design philosophy in that simplicity instead of mass is incorporated to accomplish structural goals. This produces an assembly that instead of weighing over 150 pounds per side, only weighs 35 pounds per side. Instead of heavy hinges and door latches required to support a heavy, deep door with a massive inner structure, the MPF door is designed to be of lighter material with specifically formed shapes to accomplish the same result and thus allow for the use of lighter hardware. The MPF uses uniquely designed extrusions which tie several independent characteristics into a single uniquely designed structure. The MPF adds dimension to the standard, nearly flat side extensions currently in use exclusively to control aerodynamics. The MPF simplifies componentry by reducing three otherwise independent functions into a single extrusion design—grab rails; T-slot extrusions for rubber bumper extensions; and side panel locking mechanism to seal and lock side panel joints. The MPF utilizes an area considered by others, including major OEMs, not to have any useful purpose or not economically practical to develop.

The following is claimed:

1. A multi-purpose fairing adapted to be operatively mated with a truck cab comprising:

a side skin, a forward skin, and an inner skin; said side skin, forward skin, and inner skin being joined together to form an integral unit defining a volume; in which said truck cab has two sides and a back, the side skin is oriented along a longitudinal axis of the truck cab which is substantially perpendicular to said back of said truck cab, the forward skin is essentially aligned substantially parallel with the back of the truck cab, first edges of the side skin and forward skin are joined adjacent a rear corner of one of said sides of the truck cab, and in which the volume defined further comprises at least one utility shelf disposed horizontally between said side skin, said forward skin, and said inner skin.

2. The multi-purpose fairing of claim 1 wherein said at least one utility shelf further comprises an upwardly facing flange on an edge of said at least one utility shelf, said edge adjacent one or more of the side skin, forward skin, and inner skin.

3. A multi-purpose fairing adapted to be operatively mated with a truck cab comprising:

a side skin, a forward skin, and an inner skin; said side skin, forward skin, and inner skin being joined together to form an integral unit defining a volume; and further comprising a door attached to said inner skin, said door being open and closeable.

4. The multi-purpose fairing of claim 3 wherein said door forms a seal with said inner skin when said door is closed.

5. A multi-purpose fairing adapted to be operatively mated with a truck cab comprising:

a side skin, a forward skin, and an inner skin; said side skin, forward skin, and inner skin being joined together to form an integral unit defining a volume; and further comprising a door attached to said side skin, said door being open and closeable.

6. The multi-purpose fairing of claim 5 wherein said door forms a seal with said side skin when said door is closed.

7. A multi-purpose fairing adapted to be operatively mated with a truck cab comprising:

a side skin, a forward skin, and an inner skin; said side skin, forward skin, and inner skin being joined together to form an integral unit defining a volume; and further comprising a bumper joined to said side skin.

8. The multi-purpose fairing of claim 7 wherein said trailing edge portion is a rubber corner bumper.

9. A multi-purpose fairing adapted to be operatively mated with a truck cab comprising:

a side skin, a forward skin, and an inner skin; said side skin, forward skin, and inner skin being joined together to form an integral unit defining a volume; and further comprising an extruded member connecting said side skin to said inner skin.

10. A multi-purpose fairing adapted to be operatively mated with a truck cab comprising:

a side skin, a forward skin and an inner skin; said side skin, forward skin, and inner skin being joined together to form an integral unit defining a volume; and including an integral hand rail at a joinder of the side skin and the inner skin.

11. The multi-purpose fairing of claim 9 wherein said extruded member comprises a first slotted joggle for connecting said side skin to said extruded member, a second slotted joggle for connecting said inner skin to said extruded member, and a T-slot for connecting a bumper to said extruded member.

12. The multi-purpose fairing of claim 11 wherein said extruded member is formed from aluminum.

13. A multi-purpose fairing adapted to be operatively mated with a truck cab comprising:

a side skin, a forward skin, and an inner skin; said side skin, forward skin, and inner skin being joined together to form an integral unit defining a volume; and further comprising an extruded member connecting said forward skin to said inner skin.

14. The multi-purpose fairing of claim 13 wherein said extruded member comprises a first slotted joggle for connecting said forward skin to said extruded member, a second slotted joggle for connecting said inner skin to said extruded member, and a forward mounting flange adapted to be mounted to the rear of a truck cab.

15. The multi-purpose fairing of claim 14 wherein said extruded member is formed from aluminum.

16. A multi-purpose fairing adapted to be operatively mated with a truck cab comprising:
   a side skin, a forward skin, and an inner skin; said side skin, forward skin, and inner skin being joined together to form an integral unit defining a volume; one of said skins having an opening;
   a door attached to said one of said skins having an opening; and
   an integral handrail attached at a joinder of the side skin and the inner skin.

17. The multi-purpose fairing of claim 16 wherein said side skin and said inner skin are joined by a first extruded member; and said forward skin and said inner skin are joined by a second extruded member.

18. A multi-purpose fairing adapted to be operatively mated with a truck cab comprising:
   a side skin, a forward skin, and an inner skin; said side skin, forward skin, and inner skin being joined together to form an integral unit defining a volume; and wherein said truck cab has two sides, and said side skin is adapted to partially overlap one of said sides of the truck cab when mounted with said truck cab.

19. A multi-purpose fairing adapted to be operatively mated with a truck cab comprising:
   a side skin, a forward skin, and an inner skin; said side skin, forward skin, and inner skin being joined together to form an integral unit defining a volume; and wherein a bumper is joined to an edge of at least one of said side skin and said inner skin and further includes an opening therein to form a hand grip.

20. The multi-purpose fairing of claim 16 wherein a trailing edge portion is joined to an edge of at least one of said side skin and said inner skin and further includes an opening therein to form a hand grip.

\* \* \* \* \*